United States Patent
Hoang et al.

(10) Patent No.: US 6,688,324 B2
(45) Date of Patent: Feb. 10, 2004

(54) VALVE FOR HYDRATE FORMING ENVIRONMENTS

(75) Inventors: Loc G. Hoang, Houston, TX (US); David Rhea Mefford, The Woodlands, TX (US)

(73) Assignee: Cooper Cameron Corporation, Houston, TX (US)

( * ) Notice: Subject to any disclaimer, the term of this patent is extended or adjusted under 35 U.S.C. 154(b) by 70 days.

(21) Appl. No.: 10/041,914

(22) Filed: Jan. 8, 2002

(65) Prior Publication Data

US 2003/0127141 A1 Jul. 10, 2003

(51) Int. Cl.$^7$ .............................................. F16K 11/04
(52) U.S. Cl. ........................ 137/240; 137/606; 251/327
(58) Field of Search ................................ 137/240, 606, 137/605; 251/327

(56) References Cited

U.S. PATENT DOCUMENTS

| | | | |
|---|---|---|---|
| 3,244,399 A | 4/1966 | Jones et al. .................. 251/327 |
| 3,314,442 A | 4/1967 | Volpin .......................... 137/12 |
| 3,347,261 A | 10/1967 | Yancey ....................... 137/315 |
| 3,780,982 A | 12/1973 | Kemp ......................... 251/210 |
| 3,918,471 A | 11/1975 | Bedner ....................... 137/238 |
| 4,029,294 A | 6/1977 | McCaskill et al. ......... 251/282 |
| RE29,299 E | 7/1977 | Estes et al. ............. 137/246.22 |
| 4,047,697 A | 9/1977 | McGee ....................... 251/328 |
| 4,468,039 A | 8/1984 | Le et al. ..................... 277/112 |
| 4,515,174 A | 5/1985 | Hollister et al. .............. 137/72 |
| 4,685,655 A | 8/1987 | Herd .......................... 251/282 |
| 4,909,272 A | * 3/1990 | Carpentier .................. 137/240 |
| 5,127,231 A | 7/1992 | Larue et al. .................... 62/20 |
| 5,135,032 A | 8/1992 | Parks, Jr. ............... 137/630.22 |
| 5,704,594 A | 1/1998 | Wurangian .................. 251/195 |
| 5,915,402 A | 6/1999 | Mitchell, II .................. 137/15 |
| 6,164,622 A | 12/2000 | Partridge .................... 251/167 |

\* cited by examiner

*Primary Examiner*—Stephen M. Hepperle
(74) *Attorney, Agent, or Firm*—Conley Rose, P.C.

(57) ABSTRACT

Methods and apparatus for allowing the injection of hydrate inhibitors into a valve cavity without washing out the valve seals, generally comprising a valve having a sealing member, such as a gate or a ball, that provides for fluid communication between the valve cavity and the valve flowbore. One embodiment of a valve constructed in accordance with the present invention is an expanded gate valve comprising a valve body having a flowbore intersecting a valve cavity and a gate assembly disposed within said cavity. The gate assembly is a parallel expanding gate assembly having ported, juxtaposed members that are moveable into a sealing arrangement with upstream and downstream valve seats disposed about the flowbore. The gate assembly further comprises a flow path that enables direct fluid communication between the aligned ports and the valve cavity. This flow path enables hydrate inhibitors injected into the valve cavity to flow freely into the port and the flowbore without crossing the sealing faces of the gate assembly.

12 Claims, 4 Drawing Sheets

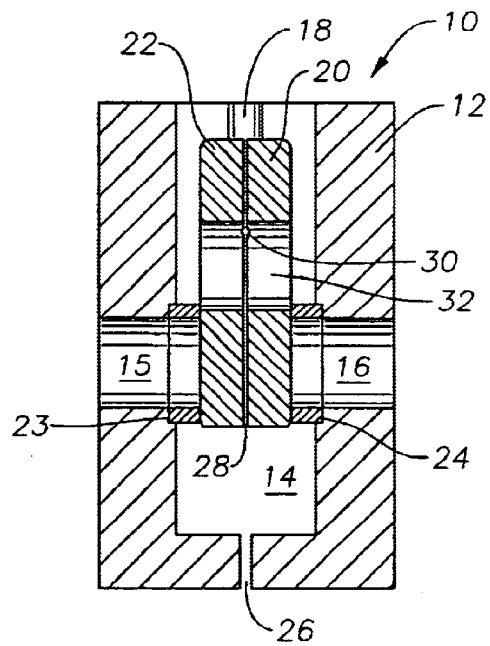
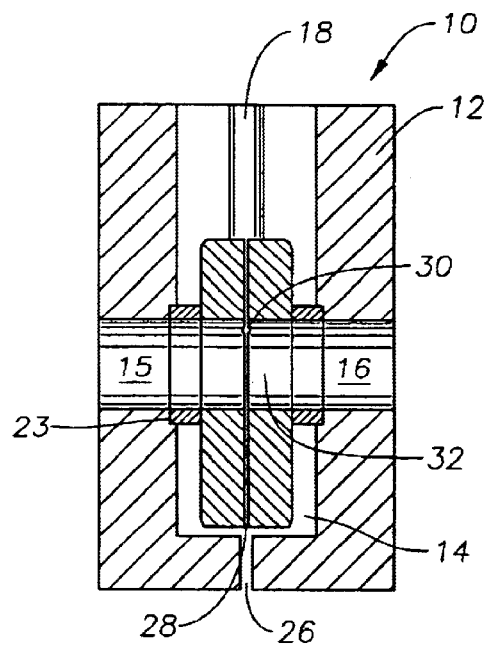
Fig. 1
Fig. 2
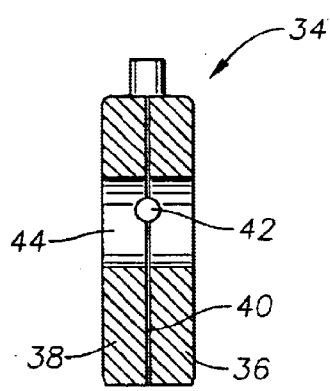
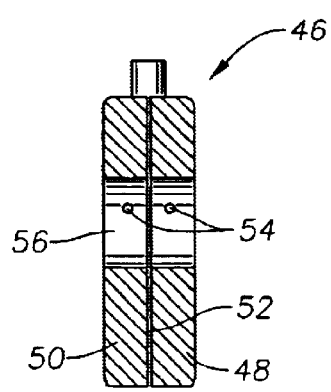
Fig. 3
Fig. 4

VALVE FOR HYDRATE FORMING ENVIRONMENTS

CROSS-REFERENCE TO RELATED APPLICATIONS

Not applicable.

STATEMENT REGARDING FEDERALLY SPONSORED RESEARCH OR DEVELOPMENT

Not applicable.

FIELD OF THE INVENTION

This invention relates to valves used in environments susceptible to the formation of hydrates. More particularly, this invention relates to methods and apparatus for preventing the formation of hydrates in valves, namely gate valves and ball valves.

BACKGROUND OF THE INVENTION

Clathrate hydrates are crystalline compounds that occur when water forms a cage-like structure around guest molecules, particularly gaseous molecules. Clathrate hydrates, especially in the petroleum industry, are referred to as gas hydrates, gas hydrate crystals, or simply hydrates. Typical hydrates formed in petroleum (hydrocarbon) environments are composed of water and one or more guest molecules such as methane, ethane, propane, isobutane, normal butane, nitrogen, carbon dioxide, and hydrogen sulfate. In general, hydrates will form when a mixture of water and hydrocarbon gases are mixed at high pressures and low temperatures.

The formation of hydrates is of particular concern in subsea hydrocarbon exploration and production where water and gaseous hydrocarbons are often in close proximity at high pressures and low temperatures. If hydrates form within subsea components they are capable of preventing actuation of critical components and of blocking the flow of fluids through the system. It is therefore desirable to take provisions to prevent the formation of hydrates in these systems.

To overcome these problems, several thermodynamic measures are possible in principal: removal of free water, maintaining an elevated temperature and/or reduced pressure, or the addition of freezing point depressants (antifreeze). As a practical matter, the last mentioned measure, i.e., adding freezing point depressants, has been most frequently applied. Thus, lower alcohols and glycols, e.g., methanol, have been added to act as antifreezes. It has been known that in lieu of antifreezes, one can employ a crystal growth inhibitor that inhibits the formation of the hydrate crystals and/or the agglomeration of the hydrate crystallites to large crystalline masses sufficient to cause plugging. Thus, surface active agents such as phosphonates, phosphate esters, phosphonic acids, salts and esters of phosphonic acids, inorganic polyphosphates, salts and esters of inorganic polyphosphates, polyacrylamids, and polyacrylates have been used.

One application that is particularly susceptible to the formation of hydrates is the secondary recovery system known as Water Alternating Gas (WAG). In a WAG system, alternating volumes of water and hydrocarbon gases are injected through an injection well into a hydrocarbon bearing formation in order to force the stored hydrocarbons into production wells drilled in the same formation. This technique is used to increase the volume of production through the adjacent production wells. When used in cold environments, including subsea, the water and the gas are often mixed at high pressures and low temperatures which are often close to the conditions at which hydrates will form.

Hydrates that form in the WAG flowline are a concern but are easily prevented by directly injecting chemicals into the flowline. More difficult is the prevention of hydrate formation within the cavity of valves used to control the flow of water and gas. If hydrates form within the valve cavities, the valves can no longer be opened or closed and the system must be shut down. Simply injecting an inhibiting chemical into the valve cavity has the potential problem of forcing material across the valve seal faces and possibly washing out the seals.

Therefore, there remains in the art a need for methods and apparatus to prevent the creation of hydrates within valve manifolds and in particular within the valve cavities. Therefore, the present invention is directed to methods and apparatus for allowing the injection of chemicals into a valve cavity without risking washout of the valve seals.

SUMMARY OF THE PREFERRED EMBODIMENTS

Accordingly, there is provided herein methods and apparatus for allowing the injection of hydrate inhibitors into a valve cavity without washing out the valve seals. The present invention generally comprises a valve having a sealing member, such as a gate or a ball, that provides for fluid communication between the valve cavity and the valve flowbore. Fluid communication between the valve cavity and the valve flowbore provides a direct fluid path and prevents a buildup of pressure within the cavity, thus preventing washout of the valve seals.

One embodiment of a valve constructed in accordance with the present invention is an expanded gate valve comprising a valve body having a flowbore intersecting a valve cavity and a gate assembly disposed within said cavity. The gate assembly is a parallel expanding gate assembly having ported, juxtaposed members that are moveable into a sealing arrangement with upstream and downstream valve seats disposed about the flowbore. The gate assembly further comprises a flow path that enables direct fluid communication between the aligned ports and the valve cavity. This flow path enables hydrate inhibitors injected into the valve cavity to flow freely into the port and the flowbore without crossing the sealing faces of the gate assembly.

One embodiment of a valve manifold employing aspects of the present invention comprises a first valve that controls flow from a water inlet and a second valve that controls flow from a gas inlet. Both valves are connected to a common outlet. Each valve comprises a valve body having a flowbore intersecting a valve cavity in which is disposed a sealing member. Each valve is also adapted to receive hydrate inhibitors, such as methanol, injected directly into the valve cavity. Each sealing member has features that, in an open position, allow direct fluid communication between the valve cavity and the flowbore without effecting the performance of the valve through washout or erosion of any sealing surfaces.

Thus, the present invention comprises a combination of features that allow fluid to be injected directly into a valve cavity, through a sealing member, and into a flowbore without degrading the sealing performance of the valve. For example, certain embodiments of the present invention allow for injection of hydrate inhibiting chemicals into a valve cavity and flowbore without washing out the sealing surfaces of the valve. These and various other characteristics and advantages of the present invention will be readily apparent to those skilled in the art upon reading the following detailed description of the preferred embodiments of the invention and by referring to the accompanying drawings.

BRIEF DESCRIPTION OF THE DRAWINGS

For a more detailed understanding of the preferred embodiments, reference is made to the accompanying Figures, wherein:

FIG. 1 is a schematic section view of an expandable gate valve in a closed position;

FIG. 2 is a schematic section view of an expandable gage valve in an open position;

FIG. 3 is one embodiment of an expandable gate assembly;

FIG. 4 is second embodiment of an expandable gate assembly;

DETAILED DESCRIPTION OF THE PREFERRED EMBODIMENTS

Figures 5, 6:
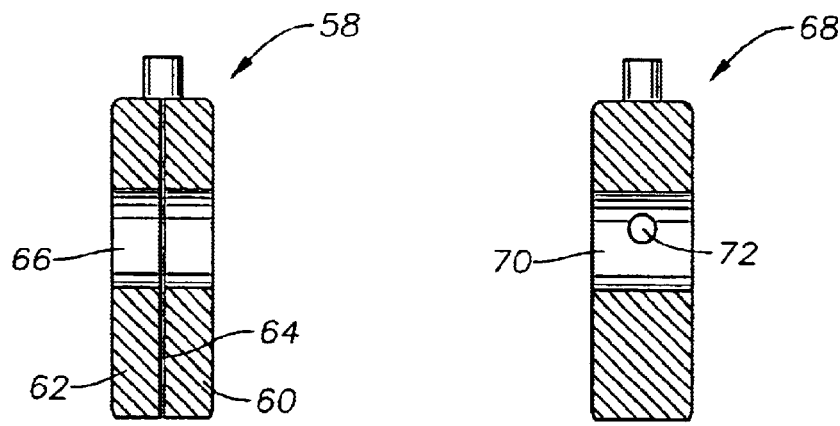
FIG. 5 is a third embodiment of an expandable gate assembly.
FIG. 6 is one embodiment of an slab-type gate.

In the description that follows, like parts are marked throughout the specification and drawings with the same reference numerals, respectively. The drawing figures are not necessarily to scale. Certain features of the invention may be shown exaggerated in scale or in somewhat schematic form and some details of conventional elements may not be shown in the interest of clarity and conciseness.

The present invention relates to methods and apparatus for injecting a material through a valve cavity and into a flowbore without degrading the sealing performance of the valve. The present invention is susceptible to embodiments of different forms. There are shown in the drawings, and herein will be described in detail, specific embodiments of the present invention with the understanding that the present disclosure is to be considered an exemplification of the principles of the invention, and is not intended to limit the invention to that illustrated and described herein. In particular, while repeated reference is made to the injection of chemicals used to inhibit the formation of hydrates, it is to be understood that the embodiments of the present invention find utility in the injection of any substance into a flowbore through a valve. Furthermore, while the embodiments described herein are gate valves and ball valves, the concepts and principals of the present invention can be applied to other valves and similar sealing equipment. It is to be fully recognized that the different teachings of the embodiments discussed below may be employed separately or in any suitable combination to produce desired results.

Referring now to FIG. 1, a schematic representation of one embodiment of a gate valve assembly 10 is shown. Assembly 10 generally comprises a valve body 12, gate 18, and sealing rings, or seats 24. Body 12 has a valve cavity 14 arranged perpendicular to a flowbore having an upstream portion 15 and a downstream portion 16. Injection port 26 provides hydraulic access to cavity 14. Seats 23, 24 are mounted where flowbore 15, 16 intersects with cavity 14. Gate 18 is preferably a split, or double gate assembly comprising a first portion 20 and second portion 22 that in a closed position, as shown in FIG. 1, that uses a biasing member (not shown), such as a spring, to push the portions outward toward seats 23, 24.

In one method of operation, the pressure in upstream flowbore 15 is higher than the pressure in downstream flowbore 16. Fluid pressure from upstream portion 15 will second portion 22 against the first portion 20 and create a seal on a seal face of first portion 20 between the downstream flowbore 16 and seat 24. The higher pressure fluid from upstream flowbore 15 will get into cavity 14 and mix with any fluid injected through port 26 to prevent the formation of hydrates. Another option is to maintain the pressure in cavity 14 higher than both upstream flowbore 15 and downstream flowbore 16. Gate 18 expands when the pressure within cavity 14 is higher than the pressure upstream 15 or downstream 16 of valve 10, thus creating two seal barriers in one valve cavity by sealing against both seats 23, 24. In this closed position, fluid injected through injection port 26 flows freely throughout cavity 14 but is isolated from both valve flowbores 15, 16.

Gap 28 preferably provides a flow path between the portions to allow injected fluid to fill cavity 14. Gate 18 may also comprise port 30 that provides hydraulic communication direct to the gate flowbore 32.

FIG. 2 depicts the valve of FIG. 1 in an open position. Gate 18 has been moved within cavity 14 so that gate flowbore 32 aligns with valve flowbore 16. In an open position, gate portions 20, 22 do not fully energize seats 23, 24, but may form a low pressure seal between gate 18 and seats 23, 24. Gap 28 and port 30 preferably provide a free flowing fluid path for material injected into cavity 14 through injection port 26 to reach all of cavity 14 as well as gate flowbore 32 and valve flowbore 16. Because fluid is allowed to pass through gap 28 and port 30, it will not flow across the sealing surfaces of gate 18 or seats 24, thereby decreasing the chances of washing out the seal surfaces.

Gap 28 and port 30 are preferably sized to allow the volume of material injected through injection port 26 to flow freely without restriction. Injection port 26 is sized to supply a sufficient amount of fluid to cavity 14 and gap 28 and port 30 are sized so that fluid will distribute throughout the cavity without significant increases in velocity. Injection port 26 preferably ranges from between ½" and 1" in diameter. Gap 28 and port 30 preferably have a combined cross-section area comparable to the area of port 26. Therefore, the above described embodiment of the present invention allows material to be injected into valve cavity 14, with gate 18 in either an open or closed position, without washing out the seal surfaces of gate 18 or seats 24.

One feature of the embodiment described above is the ability for unobstructed fluid communication throughout the valve cavity and into the flowbore while the valve gate is in an open position. This unobstructed fluid communication is achieved by providing fluid paths through the gate valve and into the flowbore. These fluid paths may be of any configuration as is practical to the chosen application. In FIG. 1, these flow paths comprise expanded gap 28 and port 30. FIG. 3 depicts a split gate assembly 34, comprising a first portion 36 and second portion 38 with a common flowbore 44. Gap 40 preferably provides a flow path through gate 34.

Gate assembly 34 may also comprise port 42 that is formed between valve portions 36, 38 that provides a flow path into flowbore 44.

FIG. 4 depicts a split gate assembly 46, comprising a first portion 48 and second portion 50 with a common flowbore 56. Gap 52 preferably provides a flow path between gate portions 48 and 50. Each gate portion 48, 50 also comprises a port 54 that provides a flow path into flowbore 56.

FIG. 5 depicts a split gate valve assembly 58, comprising a first portion 60 and second portion 62 with a common flowbore 66. Gap 64 preferably provides a flow path sized to provide a sufficient flow area so that no additional port is required.

FIG. 6 depicts a slab-type gate 68, which comprises a single piece gate with a flowbore 70. Slab-type gate valves are sealed by using upstream fluid pressure to seal against the downstream seat and do not rely on the expansion of the valve gate. Port 72, through gate 68 and into flowbore 70 provides fluid communication from the valve cavity into the flowbore with the gate in an open position.

Figure 7:
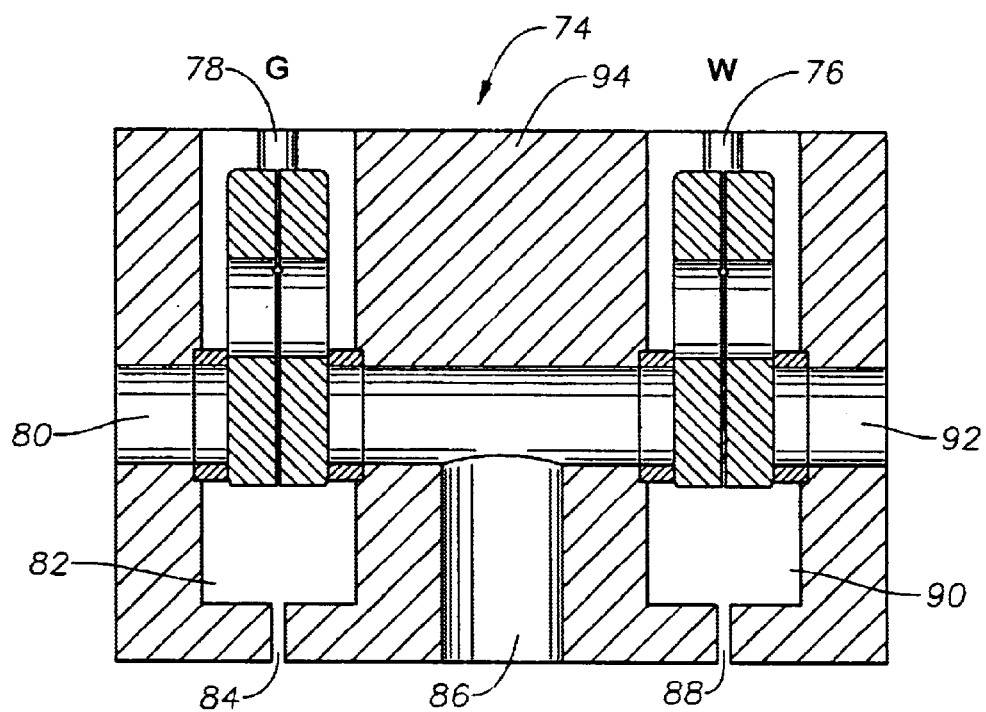
FIG. 7 is a schematic section view of typical dual-cavity block valve such as is used in a WAG manifold.
Figure 8:
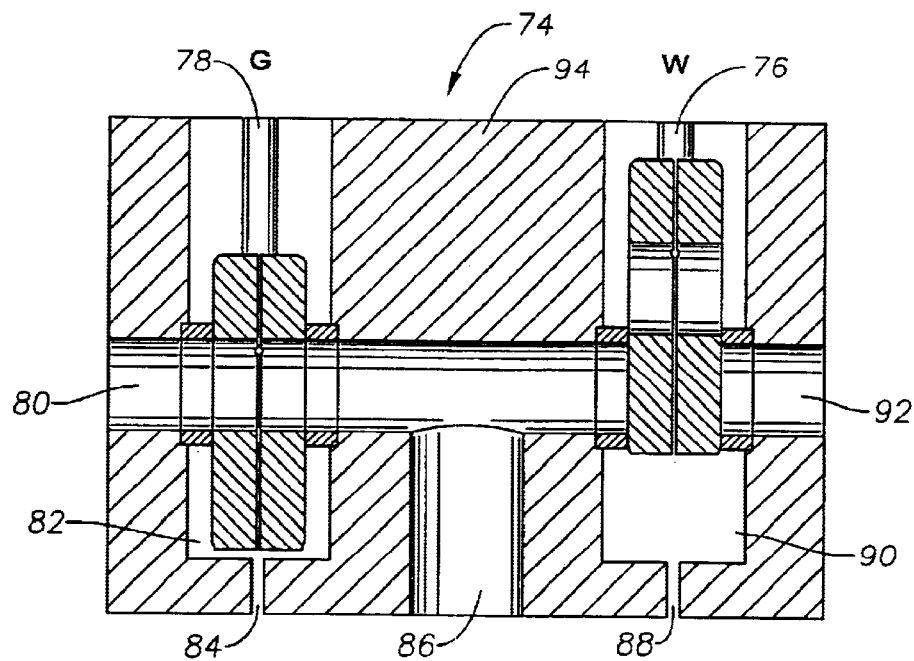
FIG. 8 is a schematic section view of typical dual-cavity block valve such as is used in a WAG manifold.
Figure 9:
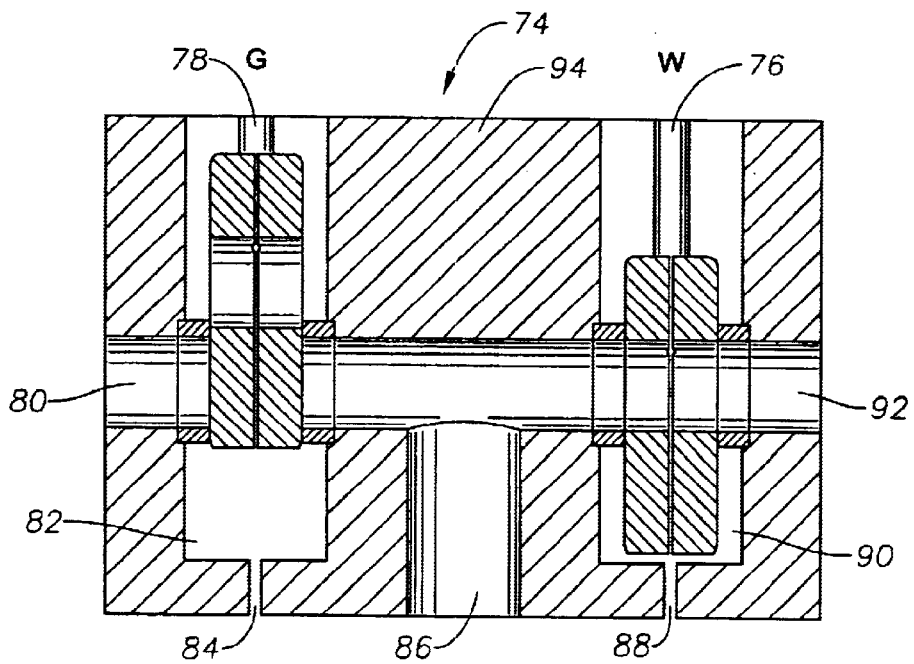
FIG. 9 is a schematic section view of typical dual-cavity block valve such as is used in a WAG manifold.

FIGS. 7 to 9 depict a dual-block valve 74 used in a WAG manifold where water and gas are injected into the formation to aid in secondary recovery of hydrocarbon resources. Valve 74 comprises a body 94 having a gas inlet 80, water inlet 92, and an outlet 86. Valve 74 also comprises gates 76, 78 that control the flow of water and gas into the valve. Gates 76, 78 are shown as split gates, such as are shown in FIGS. 1 and 2, and are disposed within cavities 82, 90. FIG. 7 depicts both gates 76, 78 in closed positions where the gates have expanded to seal against valve seats both upstream and downstream of the gate. In the position shown in FIG. 7, a hydrate inhibiting material, such as methanol, can be injected through injection ports 84, 88 into cavities 82, 90. The inhibiting material is preferably injected at a pressure higher than the pressure in either inlet 80, 92 or outlet 86. As previously described, split gates 76, 78 will expand to seal both upstream and downstream of the gate, thus isolating the cavities 82, 90 from the water and gas. The inhibiting material will mix with any fluid in cavity 82, 90 and prevent the formation of hydrates which could impede the actuation of gates 76, 78.

FIG. 8 shows valve 74 configured to inject gas into a well. Gate 78, which controls the flow from gas inlet 80, is opened while gate 76, which controls flow from water inlet 92, remains closed. Hydrate inhibiting chemicals injected through injection port 84 into cavity 82 can flow freely into the gas flow, thus preventing the formation of hydrates in cavity 82 and outlet 86. FIG. 9, shows valve 74 configured to inject water into a well. Position of gates 76, 78 has been reversed so that gate 76 is open and gate 78 is closed. Hydrate inhibiting chemicals injected through injection port 88 into cavity 90 can flow freely into the water flow, thus preventing the formation of hydrates in the cavity 90 and outlet 86. Therefore, valve 74, by way of gates 76, 78, which provide hydraulic flow paths between their respective cavities and the flowbore when in an open position, allows the injection of hydrate inhibiting material, or any other material, into both valve cavities and the flowbore of both the water and gas inlets. Thus, the formation of hydrates can be prevented throughout the entire dual-block valve.

Figure 10:
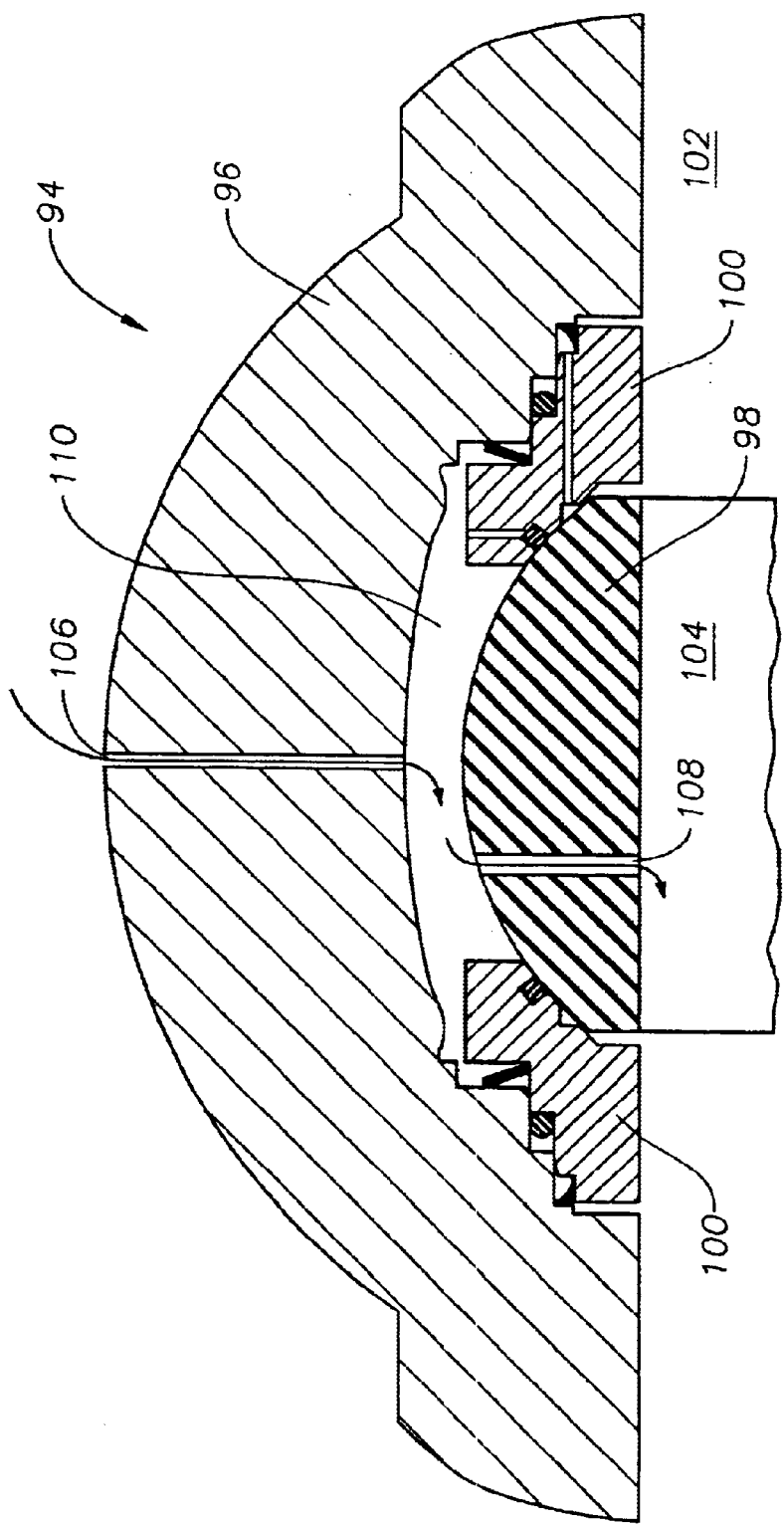
FIG. 10 is a partial section view of a ball valve.

FIG. 10 shows a partial section view of a ball valve 94. Ball valve 94 comprises a body 96 having a flowbore 102 therethrough. Body 96 also comprises a cavity 110 adapted to receive a ball 98 and sealing elements 100 that seal between ball 98 and body 96 around flowbore 92. In an open position, as shown in FIG. 10, ball flowbore 104 is aligned with valve flowbore 102. Injection port 106 through body 96 allows injection of fluid, such as a hydrate inhibitor, into cavity 110. When in the open position, flow port 108 through ball 98 allows the injected material to flow into ball flowbore 104 and valve flowbore 102. Injected material will be fully distributed around both the interior and exterior of ball 98. Therefore, in a hydrate forming environment, the injection of a hydrate inhibiting material will prevent the formation of hydrates both in cavity 110 and flowbore 102, 104, which prevents hydrates from interfering with the operation of valve 94.

In ball valves, slab gate valves, and other applications where, in the closed position, the cavity is equalized with the higher pressure flowbore, care must be taken when injecting fluid into the valve cavity not to washout the non-sealing seat by continuing to flow fluid into the cavity. In these application it may be desired to stop the injection of fluid or use specially designed seals to prevent washout.

Therefore, the above described embodiments provide for valves that allow for the injection of hydrate inhibitors into a valve cavity, through a sealing member, such as a gate or ball, and into the flowbore of the valve. This prevents the formation of hydrates both in the flowbore and in the valve cavity, ensuring that the valve can actuate when needed. The sealing member is specially adapted with flow ports, or other flow paths, that enable the free flow of fluid from the cavity and into the flowbore without flowing over seal areas that are susceptible to washout. The embodiments of the present invention find particular utility in applications that involve the use of water and hydrocarbon gases at conditions of high pressure and low temperature.

The embodiments set forth herein are merely illustrative and do not limit the scope of the invention or the details therein. It will be appreciated that many other modifications and improvements to the disclosure herein may be made without departing from the scope of the invention or the inventive concepts herein disclosed. Because many varying and different embodiments may be made within the scope of the inventive concept herein taught, including equivalent structures or materials hereafter thought of, and because many modifications may be made in the embodiments herein detailed in accordance with the descriptive requirements of the law, it is to be understood that the details herein are to be interpreted as illustrative and not in a limiting sense.

What is claimed is:

1. A valve comprising;
   a valve body having a cavity and a first flowbore intersecting said cavity;
   a sealing member having a second flowbore and disposed within said cavity;
   a fluid path through said sealing member intersecting with said second flowbore; and
   a port for injecting material into said cavity;
   wherein said sealing member is selectively moveable to a first position where said first and second flowbores are aligned and material injected into said cavity flows into said first and second flowbores through said fluid path.

2. The valve of claim 1 wherein said sealing member is a double gate.

3. The valve of claim 1 wherein said sealing member is an expandable gate.

4. The valve of claim 1 wherein said sealing member is a slab gate.

5. The valve of claim 1 wherein said sealing member is a ball.

6. The valve of claim 1 wherein said fluid path has a cross-sectional area at least equal to a cross-sectional area of said port.

7. The valve of claim 1 wherein said material is a hydrate inhibiting material.

8. The valve of claim 1 wherein said material is injected through said port at a flow rate and said material flows into said flowbores at said flow rate.

9. The valve of claim 1, wherein said sealing member comprises:
   a first gate portion having a first aperture;
   a second gate portion having a second aperture that is aligned with said first aperture to form the second flowbore when said sealing member is in the first position.

10. The valve of claim 1 further comprising
    an injection system for selectively injecting a pressurized material into said cavity.

11. The valve of claim 10 wherein said material is a hydrate inhibitor.

12. A valve comprising;
    a valve body having a cavity and a first flowbore intersecting said cavity;
    a sealing means having a second flowbore and disposed within said cavity;
    a means for fluid communication through said sealing member into with said second flowbore; and
    a port for injecting material into said cavity;
    wherein said sealing means is selectively moveable to a first position where said flowbores are aligned and material injected into said cavity flows into said flowbores through said means for fluid communication.

* * * * *